United States Patent [19]
Frank et al.

[11] Patent Number: 5,752,187
[45] Date of Patent: May 12, 1998

[54] METHOD AND APPARATUS FOR OPTIMAL HAND-OFFS IN A SATELLITE CELLULAR COMMUNICATION SYSTEM

[75] Inventors: Mark Steven Frank; Daniel Richard Tayloe, both of Phoenix, Ariz.; Dariusz Andrzej Blasiak, Chicago, Ill.

[73] Assignee: Motorola, Inc., Schaumburg, Ill.

[21] Appl. No.: 506,310

[22] Filed: Jul. 24, 1995

[51] Int. Cl.$^6$ .................................. H04Q 7/00; H04H 1/08
[52] U.S. Cl. .......................... 455/428; 370/316; 370/331; 455/427; 455/436; 455/443
[58] Field of Search .................................. 370/316, 320, 370/325, 331; 379/60, 59, 58; 455/33.2, 226.2, 277.2, 135, 13.3, 54.1, 25, 33.4, 12.1, 428, 429, 436, 443, 560, 427, 453; 359/172

[56] References Cited

U.S. PATENT DOCUMENTS

| | | | |
|---|---|---|---|
| 5,488,640 | 1/1996 | Redden et al. | 370/325 |
| 5,504,938 | 4/1996 | Redden | 455/436 |
| 5,509,051 | 4/1996 | Barnett et al. | 455/443 |
| 5,561,838 | 10/1996 | Chandos et al. | 455/13.1 |
| 5,574,968 | 11/1996 | Olds et al. | 455/428 |

OTHER PUBLICATIONS

Huber, J.F. "Satellite Mobile Communication," Telcom Report International 17(1994) No. 6—http://www.jou.u-fl.edu/siemens/articles/0694/694huber.htm, Jun. 1994.

Otto, D. "Iridium–A Vision Becomes Reality," Telcom Report International 18 (1995) No. 3—http://www.jou.u-fl.edu/siemens/articles/0395/395otto.htm, Mar. 1995.

*Primary Examiner*—Wellington Chin
*Assistant Examiner*—Melissa Kay Carman
*Attorney, Agent, or Firm*—Gregory J. Gorrie

[57] ABSTRACT

A subscriber unit (26) communicates with a satellite communication system (10) that projects cells. The satellites (12) and cells move relative to the earth. During every other TDMA frame, a subscriber unit (26) measures the signal strength of all candidate hand-off beams. The signal strength of the current beam is compared to the signal strength of the candidate hand-off beams. When the signal strength of the current beam is not the strongest, a counter is incremented (108). A hand-off is requested to the beam with the greatest signal level when the counter exceeds a predetermined threshold. Accordingly, only after the current antenna beam has not been the strongest beam for a certain period of time, is a hand-off requested. A different counter threshold is used for candidate hand-off beams from other satellites (12).

22 Claims, 4 Drawing Sheets

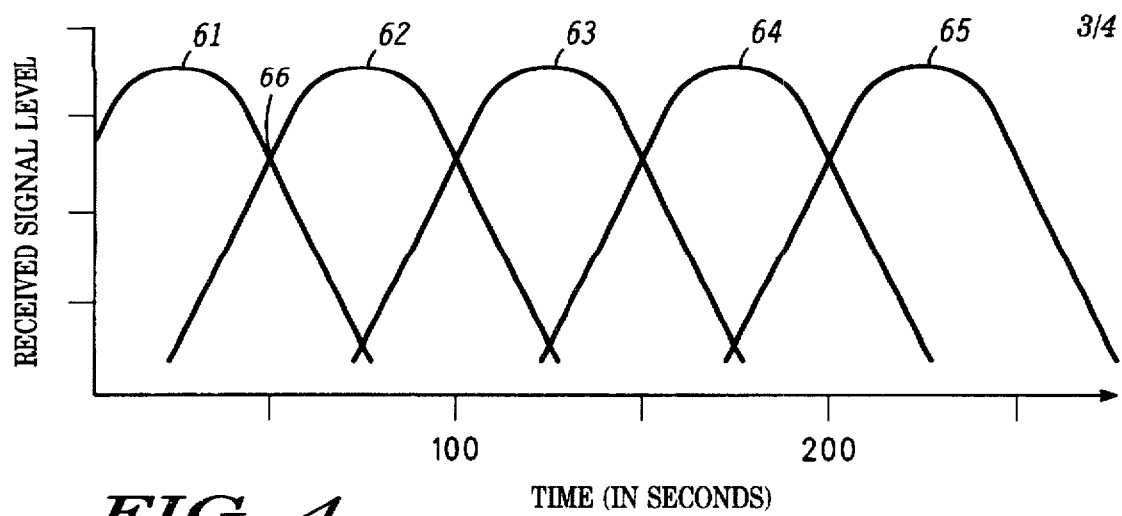
FIG. 4
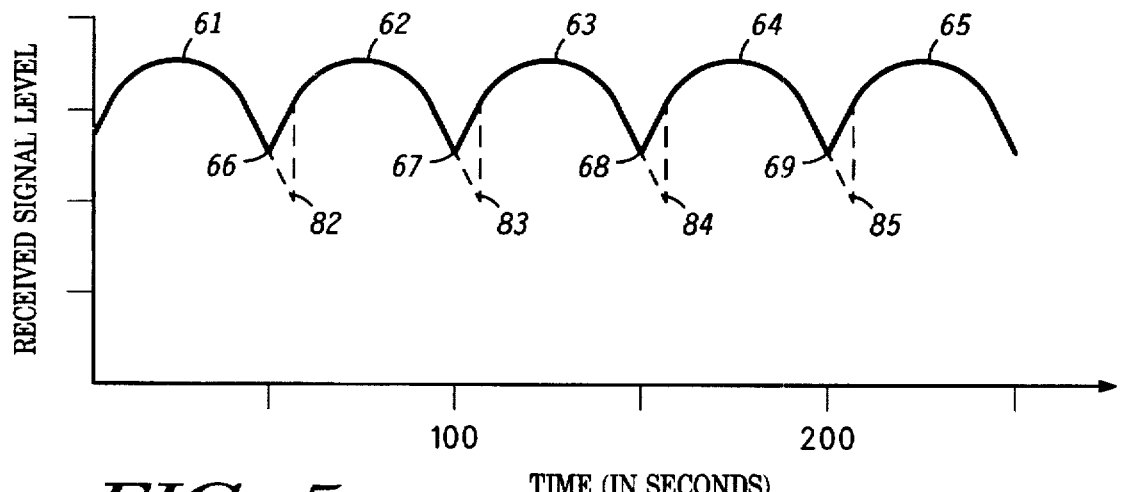
FIG. 5
FIG. 6
| SATELLITE NUMBER | BEAM ID | CURRENT BEAM | COUNTER |
|---|---|---|---|
|  |  |  |  |
|  |  |  |  |
|  |  |  |  |
| ⋮ | ⋮ | ⋮ | ⋮ |

METHOD AND APPARATUS FOR OPTIMAL HAND-OFFS IN A SATELLITE CELLULAR COMMUNICATION SYSTEM

FIELD OF THE INVENTION

This invention relates in general to the field of cellular communications. More specifically, the present invention relates to handing off communications between the cells of a satellite cellular communications system.

BACKGROUND OF THE INVENTION

A cellular communications system projects any number of cells over the earth at diverse locations. A frequency spectrum is then allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the handing off of communications between cells. Relative movement between subscriber units and cells causes the subscriber units and the communication links directed thereto to move between cells. In order to permit continuous communications in an ongoing call, the system must "hand-off" the communication when the subscriber unit crosses a cell boundary. If a communication is not handed off to a new cell upon leaving an old cell, the communication will eventually be lost because the strength of signals over which communications take place would diminish to a point where the system's radio equipment cannot receive the subscriber unit's transmissions, or vice versa.

Conventional cellular communications systems address the hand-off problem by monitoring and comparing signal strength of nearby cells. A currently used channel associated with one cell may be monitored and compared with channels associated with other cells. This type of monitoring may be performed by a subscriber unit. Alternatively, a currently used channel may be monitored from locations in two different cells, and the results of this monitoring compared. This type of monitoring may be performed by system equipment located in diverse cells. Communications are then passed off to the cell with the stronger signal.

The conventional hand-off technique may work adequately when the distances between subscriber units and system transceivers are relatively small, when the speeds of movement between cells and subscriber units are slow, and when hand-offs are relatively evenly distributed in time. Such conditions are present for conventional terrestrial cellular systems in which cells do not significantly move with respect to the earth and the movement between cells and subscriber units results from subscriber movement in accordance with conventional modes of transportation. On the other hand, when system radio equipment is located on satellites orbiting the earth in moving orbits, these conditions are not present, and the conventional hand-off techniques may be inadequate.

For example, orbiting satellites are located a relatively large distance from subscriber units, often on the order of several hundred kilometers. The smaller this distance, the greater the speed of the satellite relative to a particular position on the earth. Speeds of over 20,000 km/hr are typical. This fast movement relative to a subscriber unit may cause hand-offs to occur much more frequently than in conventional cellular systems. For these types of systems not only does the cell pattern move, but its configuration changes with time. Furthermore, cell shutdown may occur so as to maintain channel separation. This leads to additional hand-off requirements.

In terrestrial cellular systems, subscriber units are directed to remain communicating within a cell as long as possible to prevent bouncing back and forth between cells. The signal level of cells fall off at a slow rate because users generally move relatively slowly in relation individual cells. Because of this relatively slow movement, subscriber units are able to remain communicating within a cell even though other cells may have greater signal levels.

In contrast to terrestrial cellular systems, some satellite based cellular systems have cells that are moving rapidly with respect to the surface of the earth. Because of the rapid movement of cells, hand-off decisions must be made quickly. Furthermore, the inherently long propagation delays in sending and receiving messages in satellite based systems necessitates that hand-off decisions be made early.

Another factor in hand-off decisions is power consumption. Keeping subscriber units within a cell when a better cell is available results in greater power consumption because more signal level is required. Unlike terrestrial cellular communication systems, satellite based systems have limited power resources. Therefore, making hand-off decisions earlier may help reduce power consumption.

Furthermore, satellite based communication systems have less fade margin than terrestrial systems due to the long path lengths between a satellite and a subscriber unit. Because of this reduced fade margin, it is desirable to operate on antenna beams having greater signal levels, and therefore make hand-off decision quickly.

Thus what is needed are a subscriber unit and method that makes hand-off decisions. What is also needed are a subscriber unit and method that makes optimal hand-off decisions, especially in the presence of noise and fading. What is also needed are a subscriber unit and method that makes hand-off decisions quickly. What is also needed are a subscriber unit and method that makes hand-off decisions in a communication system where the cells are moving very rapidly. What is also needed are a subscriber unit and method for handing-off communications that conserves power. What is also needed are a method an apparatus that prevents fading channel measurements from causing an erroneous hand-off.

BRIEF DESCRIPTION OF THE DRAWINGS

FIG. 4 is a graph used to illustrate signal levels of various antenna beams seen by a subscriber unit as a function of time.

FIG. 5 is a graph used to illustrate when hand-offs take place as a function of time.

FIG. 6 shows an illustration of a table used to store counters for various antenna beams suitable for use in a preferred embodiment of the present invention.

DETAILED DESCRIPTION OF THE DRAWINGS

Figure 1:
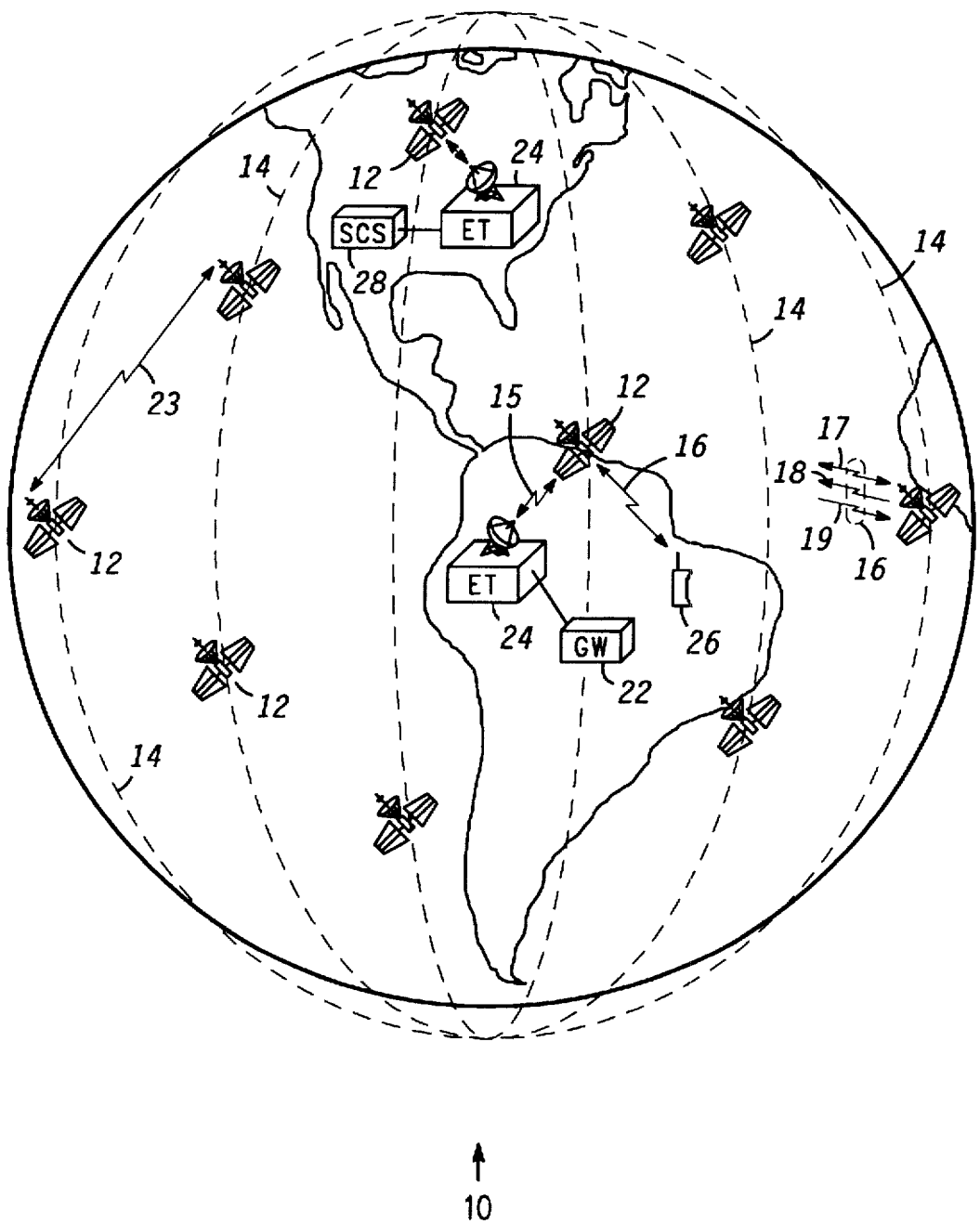
FIG. 1 illustrates a highly simplified diagram of a satellite-based communication system with which the present invention may be practiced.

The present invention provides, among other things, a subscriber unit that communicates with a satellite communication system. The satellites and cells move relative to the earth. In one embodiment, the subscriber unit measures the signal strength of all candidate hand-off beams and the signal strength of the current beam is compared to the signal strength of the candidate hand-off beams. When the signal strength of the current beam is not the strongest, a counter is incremented. If the counter exceeds a predetermined count threshold, a hand-off is requested to the beam with the greatest signal level. Accordingly, only after the current antenna beam has not been the strongest beam for a certain period of time, is a hand-off requested. A different counter threshold is used for candidate hand-off beams from other satellites.

The present invention allows a subscriber unit to follow the peak antenna beam. When operating within a cellular communication system where the cells are moving rapidly, such as a low-earth orbit satellite communication system, subscriber units avoid jumping back and forth between cells.

The present invention also provides a method and apparatus where hand-off requests are initiated by the subscriber unit rather than the communication system. The present invention also provides a method and subscriber unit that provide the communication system with information identifying the particular antenna beam in which to hand-off. The present invention also provides a method and apparatus that uses different thresholds when handing-off between antenna beams provided by the same satellite and when handing-off to an antenna beam of a different satellite. The present invention also provides a method and apparatus in which a subscriber unit may request a hand-off only once every so many seconds thereby not overloading the system with hand-off requests. The present invention also provides a method and apparatus in which hand-offs may be requested either through the current beam, or may be initiated on the antenna beam selected for hand-off. The present invention also provides a method and apparatus in which hand-offs occur closer to an optimum point of maximum signal level thereby increasing the probability of successful hand-offs and reducing the amount of power required by the subscriber unit. Likewise, the present invention may also reduce the amount of power required by a satellite. Accordingly, less power usage minimizes interference between channels.

A "satellite" is defined herein to mean a man-made object or vehicle intended to orbit earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of earth. As used herein the terms "cell", "antenna pattern" and "antenna beam" are not intended to be limited to any particular mode of generation and include those created by either terrestrial or satellite cellular communications systems and/or combinations thereof.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a subscriber unit for a maximum period of about nine minutes. Although not shown in FIG. 1, the present invention is applicable to systems including satellites having low-earth, medium-earth and geosynchronous orbits. Additionally, it is applicable to orbits having any angle of inclination (e.g., polar, equatorial or other orbital pattern).

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to communications in progress).

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

In the preferred embodiment, broadcast channels 18 are unique to each antenna beam. Broadcast channels 18 continually transmit an antenna beam identifier (beam ID) and a satellite number. In this way, an antenna beam can be distinguished from other antenna beams in the system by the data available in their broadcast channel.

Traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each communication, and each traffic channel 17 has sufficient bandwidth to support, as a minimum, a two-way voice conversation.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Accordingly, communication system 10 establishes a communication path for relaying data through the constellation of satellites 12 between any two SUs 26, between SCS 28 and GW 22, between any two GWs 22 or between SU 26 and GW 22.

Figure 2:
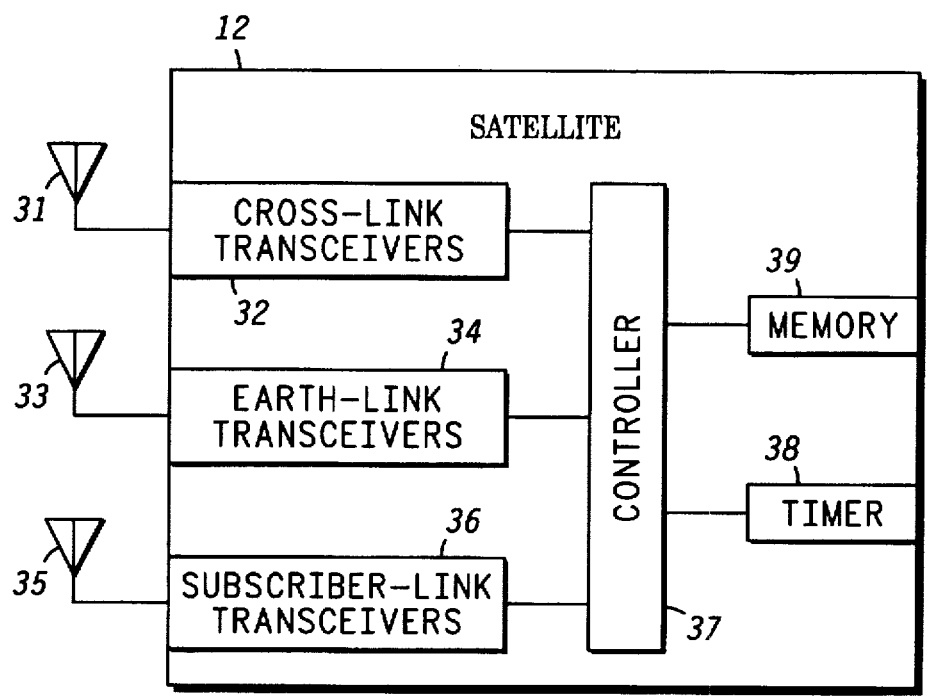
FIG. 2 illustrates a simplified block diagram of a satellite radio communication station suitable for use in a preferred embodiment of the present invention.

FIG. 2 illustrates a simplified block diagram of a satellite radio communication station suitable for use in a preferred embodiment of the present invention. Preferably, all satellites 12 within system 10 (see FIG. 1) include equipment as illustrated. Satellite 12 includes cross-link transceivers 32 and associated antennas 31. Transceivers 32 and antennas 31 support cross-links to other nearby satellites 12. Earth-link transceivers 34 and associated antennas 33 support earth-links to communicate with earth terminals 24 (FIG. 1). Subscriber-link transceivers 36 and associated antennas 35 support subscriber units 26 (FIG. 1). Preferably, each satellite 12 may simultaneously support a link for up to several thousand or more of subscriber units 26 (FIG. 1). Of course, those skilled in the art will appreciate that antennas 31, 33, and 35 may be implemented either as single multi-directional antennas or as banks of discrete antennas. It is desirable that each subscriber-link antenna 35 be a phased array antenna capable of accessing many cells simultaneously.

A controller 37 couples each of transceivers 32, 34, and 36 as well as to a memory 39 and a timer 38. Controller 37 may be implemented using one or more processors. Controller 37 uses timer 38 to maintain, among other things, the current date and time. Memory 39 stores data that serve as instructions to controller 37 and that, when executed by controller 37, cause satellite 12 to carry out various procedures. In addition, memory 39 includes variables, tables, and databases that are manipulated during the operation of satellite 12.

Subscriber-link transceivers 36 are desirably multi-channel FDMA/TDMA transceivers capable of transmitting and receiving on all different selectable frequencies during particular, selectable, time slots as directed by controller 37. Subscriber-link transceivers 36 contain multi-channel radios having sufficient number of channels to provide the desired number of transmission and reception frequencies for signal access and control and for the user voice and/or data. Controller 37 may provide for allocation of the frequency and time-slot assignments, cell-to-cell hand-off and other overhead and management and control functions. Subscriber-link transceivers 36 desirably provide for transmission and reception on any frequency channel set so that each subscriber-link transceivers 36 may, if needed, utilize the entire spectral capacity of all frequency channel sets by having the capability to handle all frequency and time slot assignments.

Subscriber-link transceivers 36 in conjunction with subscriber-link antennas 35 project a plurality of antenna beams or cells on the surface of earth. Preferably, the antenna beams implement a spectral reuse plan such that frequency channels are reused throughout an antenna pattern provide by satellite 12. In the preferred embodiment, each satellite provides at least fourth-eight antenna beams which comprise the antenna pattern of one satellite.

Figure 3:
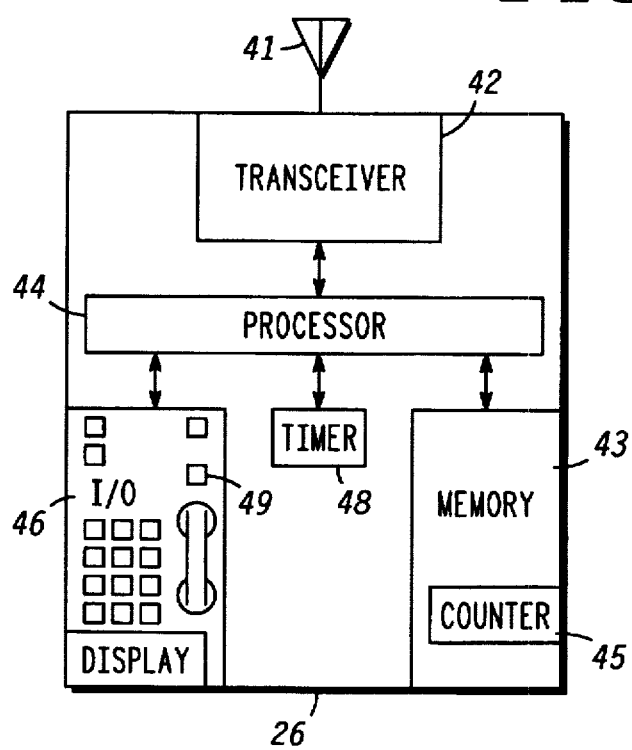
FIG. 3 illustrates a simplified block diagram of a subscriber unit suitable for use in a preferred embodiment of the present invention.

FIG. 3 illustrates a simplified block diagram of a subscriber unit suitable for use in a preferred embodiment of the present invention. Subscriber unit 26 (analogous to subscriber unit 26 of FIG. 1) communicates with communication system 10, and may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The broadcast channel receiver portion receives broadcast channels 18 provided by satellites 12. The traffic channel transceiver portion communicates with communication system 10 on a traffic channel assigned by satellite 12. Those of ordinary skill in the art will understand that the acquisition channel transceiver portion, the broadcast channel receiver portion and the traffic channel transceiver portion may be contained in one unit capable of all three functions.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

FIG. 4 is a graph used to illustrate signal levels of various antenna beams seen by a subscriber unit as a function of time. Communication system 10 (FIG. 1) produces antenna beams (i.e., cells) that move rapidly with respect to the surface of the earth. As a satellite moves within range of a subscriber unit, a subscriber unit located on the surface of the earth sees these various antenna beams at different signal levels as a function of time. The antenna beams may be provided by one or more of satellites 12 (FIG. 1). FIG. 4 illustrates this situation and shows signal levels of antenna beams 61, 62, 63, 64 and 65 as seen by a subscriber unit that is relatively stationary on the surface. In this example, within a period of 300 seconds, five different antenna beams come within view of a subscriber unit. The exact number of antenna beams and the time required for beams to come and go depend on many factors including system configuration, satellite orbit and speed, cell size and signal power levels.

As shown in FIG. 4, antenna beam 61 has the greatest signal level for about the first 50 seconds, while antenna beam 62 has the greatest signal level for about the next 50 seconds. Antenna beam 63 has the greatest signal level for about the time from 100–150 seconds while antenna beam 64 has the greatest signal level for about the time from 150–200 seconds. Antenna beam 65 has the greatest signal level for about the time from 200 to 250 seconds. Those of skill in the art understand that a certain amount of fade margin is necessary for acceptable communications to take place which is related to received signal levels.

The power levels of the antenna beams are shown in FIG. 4 for illustrative purposes only. Those of skill in the art will understand that actual antenna beam patterns may be more complex, and several antenna beams may overlap at any given instant in time. Furthermore, the exact signal levels and antenna beam coverage durations depend substantially on, among other things, the speed and orbit of the satellites and the size of the antenna beams.

Ideally, a subscriber unit communicates on the antenna beam having the greatest received signal level available at the subscriber unit. If this were always the case, hand-offs among antenna beams would occur at a time when the lines in FIG. 4 cross. For example, if a subscriber unit were communicating on antenna beam 61, a hand-off to beam 62 would desirably occur at point 66. In this way, the subscriber unit communicates on an antenna beam with the greatest signal level.

FIG. 5 is a graph used to illustrate when hand-offs take place as a function of time. FIG. 5 shows the power levels of various antenna beams seen by a subscriber unit as a function of time from FIG. 4. When the criteria used for determining when to hand-off uses an average power level over time, hand-offs occur at times indicated by points 82, 83, 84 and 85. As can be seen, prior to the hand-off, the subscriber unit is communicating with a lower received signal level. In other words, more RF power is required by a subscriber unit to maintain a certain signal level. If the subscriber unit hands off between antenna beams at points 66, 67, 68 and 69, signal level is maximized and the required signal level is minimized. This is discussed in more detail below.

As indicated by hand-off points 82, 83, 84 and 85, hand-off decisions are delayed in order to minimize the number of hand-offs that might occur. This is necessary in a terrestrial systems to prevent hand-offs back and forth between two cells in which a mobile subscriber may be moving along the boundary of the two cells. Unnecessary hand-offs tie up system resources including communication channels, and increase the risk of a dropped call. Another reason that the hand-off decision can be delayed in terrestrial systems is that a mobile subscriber travels relatively slowly with respect to cell boundaries and the system can afford to wait until making a hand-off decision. Although the time scale of the graph of FIG. 5 is shown in seconds, in terrestrial systems, the time scale is more on the order of minutes.

On the other hand, satellite communication systems where the cells (antenna beams) are moving rapidly with respect to the surface of the earth should make hand-off decisions quickly because signal levels fall off very rapidly. Delaying a hand-off decision may result in less than acceptable communications. For example, communication with less than acceptable signal level or fade margin may result. In a worst case, synchronization may be lost or the call may be dropped. In the example shown in FIG. 1, satellites 12 located several hundred kilometers above earth travel typically at speeds of over 20,000 km/hr. In this embodiment, antenna beams fall off at a rate of up to approximately 1 dB/sec. Therefore, hand-off decisions should be made very rapidly, desirably between one and five seconds and preferably between two and three seconds. In the preferred embodiment, the relative direction of a subscriber unit 26 through an antenna beam is substantantially set by the high rate of speed of a passing satellite 12. Candidate beam hand-off lists are preferably used to exclude unnecessary hand-offs to antenna beams moving away from the subscriber unit. Accordingly, ping-ponging between cells is avoided.

FIG. 6 shows an illustration of table 70 used to store counters for various antenna beams suitable for use in a preferred embodiment of the present invention. Table 70 is preferably stored in memory 43 of subscriber unit 26. Table 70 includes satellite number field 72, beam ID field 74, current beam field 76 and counter field 78. A subscriber unit updates the information in table 70 from information received from communication system 10 (FIG. 1). Preferably, broadcast channels 18 (FIG. 1) provided by satellite 12 (FIG. 1) provide the beam ID and the satellite number. In this way, a subscriber unit receiving broadcast channels from several different antenna beams can distinguish between them. The use of table 70 is discussed in more detail below. Counter 45 (FIG. 3) is, and other information of table 70 are preferably stored in memory 43 (FIG. 3) of the subscriber unit.

Figure 7:
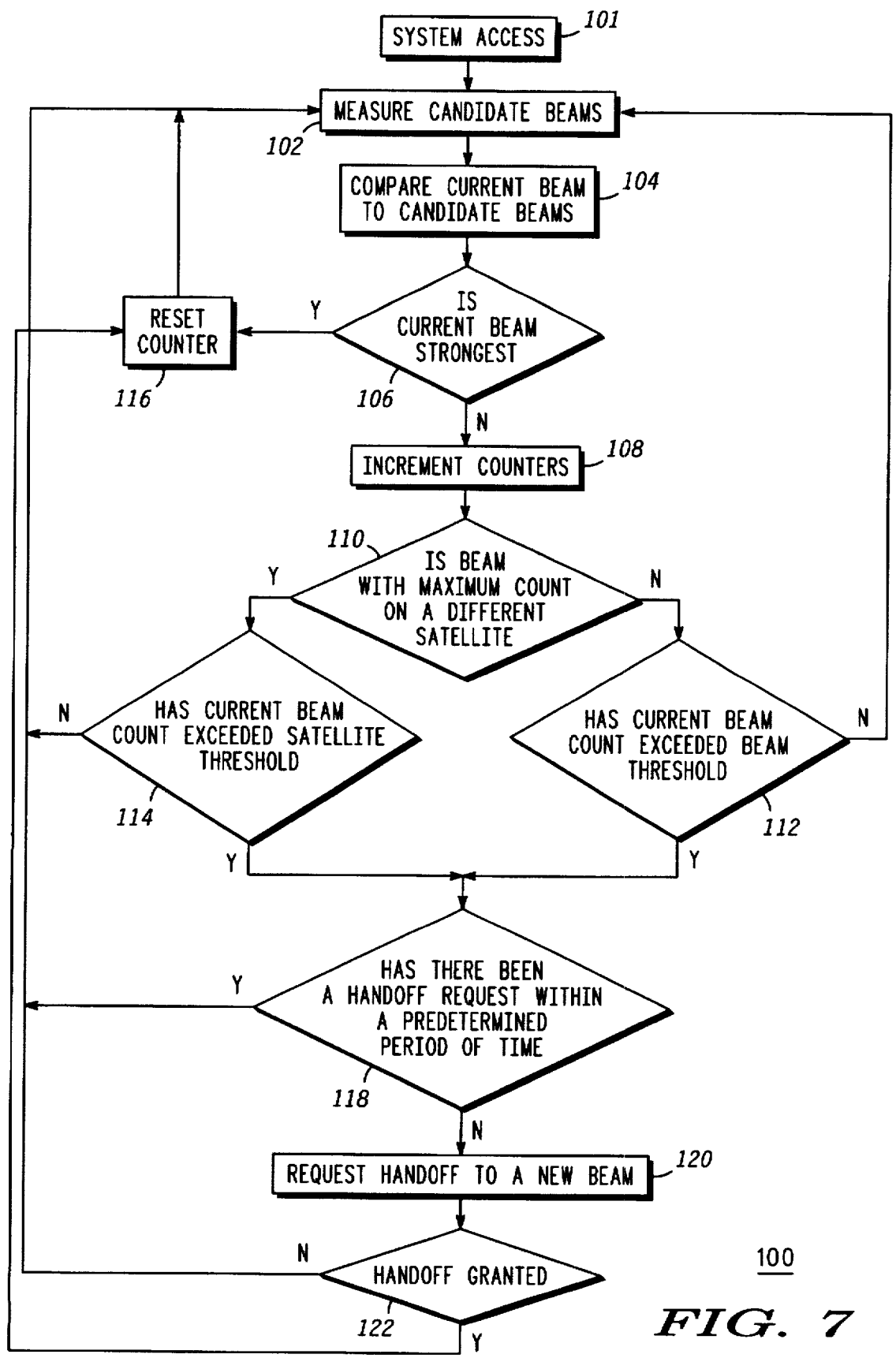
FIG. 7 illustrates a hand-off procedure suitable for use in a preferred embodiment of the present invention.

FIG. 7 illustrates hand-off procedure 100 suitable for use in a preferred embodiment of the present invention. Preferably, procedure 100 is performed by a subscriber unit similar to subscriber unit 26 (FIG. 3). Desirably, processor 44 in conjunction with transceiver 42, memory 43 and timer 48, among other things, perform the several tasks of procedure 100. Procedure 100 is preferably performed concurrently with other procedures and processes that are being executed by a subscriber unit. In addition, procedure 100 is preferably performed by a subscriber unit during communication with a satellite, such as satellite 12 (FIG. 1).

In the preferred embodiment, a subscriber unit accesses to the communication system and is assigned a traffic channel. During a TDMA frame, a subscriber unit measures the signal strength of candidate hand-off beams. The signal strength of the current beam's broadcast channel is compared to the signal strength of the candidate hand-off beams' broadcast channels. When the signal strength of the current beam broadcast channel is not the strongest, counters associated with the current beam and the strongest beam are incremented. If the current beam counter exceeds a predetermined count threshold, a hand-off is requested to the beam with the largest beam count. Accordingly, only after the current antenna beam has not been the strongest beam for a certain period of time, is a hand-off requested. This helps reduce the chance that a hand-off will be requested to another antenna beam momentarily having a greater signal level, while allowing prompt assignment of a subscriber unit to another beam when the current beam is not consistently the strongest. A different counter threshold may be used for candidate hand-off beams that are from other satellites.

In task 101, a subscriber unit initiates access to the communication system on a particular antenna beam. The antenna beam may be chosen by several methods including selecting the antenna beam with the greatest RF signal level. In the preferred embodiment, the signal levels of broadcast channels 18 (FIG. 1) are used to determine an antenna beam having the greatest RF signal level. However, the signal level of traffic channels 17 may also be used. The exact method of selecting an initial antenna beam to access a communication system is not important for the present invention and those of skill in the art know how to select antenna beams to request access. Furthermore, methods of accessing a cellular communication are well know in the art and need not be discussed here. Part of the acquisition procedure is to assign a subscriber unit a traffic channel that is associated with a particular antenna beam. A traffic channel assignment allows the subscriber unit to begin two-way communication with the communication system. Tasks 102–122 are preferably performed during communication with the communication system.

In task 102, the subscriber unit measures the signal levels of all candidate hand-off beams. Preferably, the signal level of the broadcast channel is measured, however, signal level measurements of other channels (e.g., traffic channels 17 (FIG. 1) may also be used. In the preferred embodiment, non-coherent power measurements are performed on each antenna beam, however nothing requires this and other types of signal strength measurements may be used. The candidate hand-off beams may be determined in several ways. For example, in one embodiment, any beam that has a minimum RF signal level at the subscriber unit can be a candidate hand-off beam.

In another embodiment, the subscriber unit contains a list of all antenna beams that are provided by a satellite based on a predefined system configuration. In this embodiment, based on the current antenna beam in which the subscriber unit is communicating, candidate hand-off beams are determined as those which will subsequently serve the location of the subscriber unit. In another embodiment, a satellite can provide the subscriber unit with a list of candidate hand-off beams. In the preferred embodiment shown in FIG. 1, there are typically between five and eight candidate hand-off beams.

In the preferred embodiment, a subscriber unit updates a table similar to table 70 (FIG. 6) whenever task 102 of procedure 100 is executed. For each candidate hand-off beam measured in task 102, a subscriber unit receives a beam ID and a satellite number from the broadcast channel of the antenna beam. An entry 71 is either created or maintained in table 70 for each of the candidate hand-off beams and for the current beam. The satellite number is included in satellite number field 72, and the beam ID is included in the beam ID field. In addition, current beam field 76 is included to indicate whether or not the antenna beam that is measured is the current beam.

In task 104, the signal level of the current beam in which the subscriber unit is communicating is compared to the signal level of a candidate hand-off beam that has the greatest signal level. Task 104 uses the measured information from task 102.

Task 106 determines whether the signal level of the current antenna beam is stronger when compared to the signal levels of the candidate hand-off beams. When the signal level of the current antenna beam is not the strongest, task 108 is executed.

In one embodiment, task 106 determines whether the signal level of the current antenna beam is stronger by at least a predefined margin when compared to the signal levels of the candidate hand-off beams. In another embodiment, task 106 determines whether the signal level of the current antenna beam is within a predefined margin of the signal levels of the candidate hand-off beams.

In task 106, when the signal level of the current antenna beam is the stronger or within a predefined range or margin compared to signal levels of the candidate hand-off beams, task 116 is executed. In task 116, a counter associated with the current beam is reset to zero. Counters that are associated with other beams are also set to zero. This is discussed in more detail below.

In task 108, a counter for the current beam is incremented. This is referred to as the current beam counter. In one embodiment, a counter for the candidate hand-off beam having the maximum power is also incremented. Accordingly, the current beam counter is incremented when the current beam is not the beam with the maximum signal level, while the counter associated the maximum signal strength candidate hand-off beam is incremented when that beam has the maximum signal level. The counters are updated by the subscriber unit and stored in table 70 (FIG. 6).

In the preferred embodiment, subscriber units communicate with satellite communication nodes on TDMA channels. In this embodiment, tasks 102–106 of procedure 100 are performed once for every other TDMA frame. Accordingly, when the current antenna beam is not the strongest beam that the subscriber unit sees, the counter for the current beam is incremented every other TDMA frame. Desirably, the TDMA channels have frames that are between fifty and one-hundred-fifty milliseconds in length, and preferably about ninety milliseconds in length. In this case, the counter for the current beam is incremented approximately every so many milliseconds since the length of the TDMA frames are generally fixed.

Based on the information accumulated in table 70, task 110 determines whether the antenna beam that has the maximum accumulated count is an antenna beam from the same satellite as the current beam, or from a different satellite. In determining which antenna beam has the maximum accumulated count, the presently assigned antenna beam is not included. When task 110 determines that the beam having the maximum accumulated count is from the same satellite as the current satellite, task 112 is executed. When task 110 determines that the beam having the maximum accumulated count is from a different satellite, task 114 is executed.

Task 112 determines if the current beam counter has exceeded a predetermined beam to beam threshold. The beam to beam threshold is desirably a number between 10 and 20 and preferably around 14–16. Task 114 determines if the current beam counter has exceeded a predetermined satellite to satellite threshold. The satellite to satellite threshold is desirably a number between 30 and 50 and preferably around 36–42. In the embodiment where task 102 measures the candidate hand-off beams once every other TDMA frame, when a threshold is exceeded, the current beam has not been the most powerful beam for twice as many TDMA frames as the threshold. In one embodiment, the thresholds are based on equivalent time units (e.g., seconds) rather than count numbers. For example, in this embodiment, when TDMA frames are around 90 milliseconds in length, a beam threshold of 15 counts would be 2.7 seconds when the signals are compared every other TDMA frame.

When either task 112 or 114 determines the current beam counter exceeds the respective threshold, task 118 is executed. When either task 112 or 114 determines the current beam counter does not exceed the respective threshold, the procedure loops back to task 102.

Task 118 determines if a predetermined period of time has passed since either the subscriber unit was assigned a traffic channel or the subscriber unit has requested a hand-off. In the preferred embodiment, the predetermined period of time is desirably between three and ten seconds, and preferably around five seconds. In this way, hand-off requests occur only after a minimum period of time has passed. This reduces the burden on a satellite that may be receiving hand-off requests from many subscriber units. When task 118 determines that the predetermined period of time has passed since either the subscriber unit was assigned a traffic channel or the subscriber unit has requested a hand-off, task 120 is executed. When task 118 determines that the predetermined period of time has not passed since either the subscriber unit was assigned a traffic channel or the subscriber unit has requested a hand-off, procedure 100 loops back to task 102.

In task 120, the subscriber unit initiates a hand-off request to a new antenna beam. Preferably, the subscriber unit selects the new antenna beam from table 70 (FIG. 6). In the preferred embodiment, the selection of the new antenna beam is based on the counts that have accumulated for the candidate hand-off beams. For example, the candidate hand-off beam having the greatest accumulated count is selected. In this way, the candidate hand-off beam selected for hand-off is an antenna beam that has had the greatest signal level for the greatest number of frames. This results in a more optimum choice for a hand-off and helps prevent initiating a hand-off request to an antenna beam that may look better at a given instant but may not be the best choice for a hand-off.

In another embodiment of the present invention, the antenna beam selected for hand-off in task 120 is the candidate hand-off beam currently having the strongest signal strength at that moment as determined by task 102.

As part of the hand-off request, the subscriber unit informs the communication system which antenna beam the subscriber unit has selected for a hand-off. Furthermore, as part of the hand-off request when the selected antenna beam is from a different satellite then the current antenna beam, the subscriber unit informs the communication system that the selected antenna beam is associated with a different satellite. Preferably, the hand-off request identifies the satellite number and a beam ID of the selected candidate hand-off beam that uniquely distinguish the selected beam from all other antenna beams in the communication system.

In another embodiment of the present invention, the subscriber unit initiates a hand-off request of task 120 by requesting access on an acquisition channel associated with the selected candidate hand-off beam. As part of the access request, the subscriber unit informs the communication system that this is a request for hand-off. Preferably, the subscriber unit provides the system with an identifier so that the present communication within the current beam can be uniquely identified and switched to the selected beam.

After the subscriber unit initiates a hand-off request in task 120, the communication system may assign the subscriber unit a traffic channel in the selected candidate hand-off beam. The subscriber unit then switches the newly assigned traffic channel. Hand-offs between antenna beams or cells are well know in the art and need not be discussed in detail here.

Task 122 determines whether the hand-off was granted or denied by the communication system. Preferably, when a hand-off is granted, the satellite sends a hand-off acknowledgment to the subscriber unit, and continues to send this until the subscriber unit begins communicating within the new antenna beam. The satellite may also send a hand-off denial to the subscriber unit. If no hand-off acknowledgment is received by the subscriber unit, or if a hand-off denial is received by the subscriber unit, the subscriber unit remains communicating on the current antenna beam and procedure 100 loops back to task 102. Accordingly, another hand-off request of task 120 cannot be initiated until the predetermined period of time of task 118 passes.

In some situations when a hand-off is denied by the communication system, the communication channel on which the subscriber unit is currently communicating may become unacceptable for communications and the communication may be dropped.

After a hand-off is granted and the subscriber unit is communicating on the new antenna beam, the current beam counter and all other candidate beam counters are reset to zero in task 116. The current beam is set to the beam in which the subscriber unit is presently communicating. Preferably, table 70 is updated accordingly. After task 116, procedure 100 loops back to task 102 in which the newly assigned antenna beam becomes the current antenna beam.

In one embodiment of the present invention not shown in FIG. 7, if a hand-off to a new antenna beam is denied by task 122, the current beam counter is reset prior to performing task 102. The counters associated with the candidate hand-off beams are also reset prior to performing task 102. Since a hand-off did not occur, the current beam is not changed. In this embodiment, new antenna beams coming into view are considered equally with previously considered antenna beams.

In another embodiment of the present invention, tasks 110, 112 and 114 may be combined into a single task that compares the accumulated counters for each of the candidate hand-off beams with a predetermined threshold. Beams on the same satellite as the current beam have a predetermined beam to beam threshold discussed above. Beams on a different satellite than the current satellite have a predetermined satellite to satellite threshold discussed above. When none of the counters for any one candidate hand-off beams exceeds their associated threshold, procedure 100 loops back to task 102. In this way, tasks 102–108 are repeated until one of the counters for a candidate hand-off beam exceeds a threshold. In this embodiment, it is only necessary for task 108 to increment the counter associated with the strongest antenna beam father than also incrementing a counter associated with the current beam.

While procedure 100 is preferably performed by a subscriber unit that is currently in communication with a satellite, tasks 102–122 of procedure 100 may be performed by a subscriber unit to determine which antenna beam to initiate access to the communication system. Accordingly, a subscriber unit accesses the communication system on a more optimal antenna beam, rather than selecting an antenna beam having the greatest instantaneous signal level.

For example, in reference to FIG. 5, a subscriber unit currently communicating on antenna beam 61 performs the loop of tasks 102, 104, 106 and 116 until the point 66. At point 66, antenna beam 62 starts to have a greater received signal level than antenna beam 61. Thus task 106 determines that the current beam is not presently the strongest beam and task 108 is executed, incrementing the counters. For each successive measurement of the current beam and candidate hand-off beams in task 102, the current beam is no longer the strongest. When the conditions of either task 112 or 114 are met, a hand-off to beam 62 is requested. Since the processing time of tasks 102–120 of procedure 100 is relatively small, hand-offs can be requested very quickly depending on how often task 102 is performed. In this way, a subscriber unit performing procedure 100 communicates on an antenna beam having the greatest received signal level most of the time.

In a satellite communication system, such as communication system 10 (FIG. 1), subscriber unit movement is generally negligible compared with the rapid movement of antenna beams. Accordingly, a subscriber unit's movement through the antenna beams occurs in a predictable direction and speed. If the antenna beams and satellites were viewed as fixed, it would appear that the subscriber units were moving at a uniform speed and direction through the cells. In addition, antenna beams provided by the same satellite fade at substantially the same rate because a satellite may be viewed as a point source. Accordingly, because antenna beams provided by the same satellite are subject to the same fading and terrain occlusion effects, the signal strength may be more equally considered to determine if a hand-off is necessary. The situation is different in terrestrial based cellular systems because, generally, cells are provided by many ground stations and subject to different and independent fading and different and independent terrain occlusion effects.

When procedure 100 is performed by a subscriber unit that operates in a satellite communication system, such as communication system 10 (FIG. 1), the subscriber unit rapidly requests hand-offs to the next appearing antenna beam. The problem of switching back and forth between cells that may occur in terrestrial systems is avoided.

Thus, a subscriber unit and method have been described which overcomes specific problems and accomplishes certain advantages relative to prior art methods and mechanisms. The improvements over known technology are significant. For example, an advantage to the present invention is that a subscriber unit initiates a hand-off when the current antenna beam is not the most powerful beam for a certain amount of time. Accordingly, the present invention takes advantage of rapidly moving cells in a known direction to quickly select a new cell for hand-off.

Another advantage to the present invention is that hand-off requests are initiated by the subscriber unit rather than the communication system. This reduces the amount of processing required by the gateway and the satellites of the communication system. Another advantage to the present invention is that the subscriber unit may provide the communication system with information identifying the particular antenna beam in which to hand-off. Another advantage to the present invention is that different thresholds may be used when handing-off between antenna beams provided by the same satellite and handing-off to an antenna beam of a different satellite.

Another advantage to the present invention is that in one embodiment, a subscriber unit may request a hand-off once every so often thereby not overloading the system with hand-off requests. Another advantage to the present invention is that in one embodiment, hand-offs are requested through the current beam. In another embodiment, hand-offs are initiated on the selected candidate hand-off beam. Another advantage to the present invention is that hand-offs occur closer to an optimum point of maximum signal level thereby increasing the probability of successful hand-offs and reducing the amount of power required by the subscriber unit. Another advantage to the present invention is that by reducing the amount of power used for communicating, co-channel interference is reduced which may result in improved communications and increased system capacity.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of handing-off subscriber unit communications between cells of a cellular communication system comprising the steps of:

comparing a signal level of a current cell with signal levels of candidate hand-off cells;

incrementing a counter when a signal level of at least one of said candidate hand-off cells is greater than said signal level of said current cell said counter being associated with said one candidate hand-off cell; and initiating a hand-off request to one of said candidate hand-off cells when said counter exceeds a predetermined number.

2. A method as claimed in claim 1 wherein said cellular communication system comprises at least one orbiting satellite that provides said cells, wherein said cells are moving relative to earth's surface, and wherein the comparing step further comprises the step of receiving a list of said candidate hand-off cells from said communication system, said candidate hand-off cells including only cells that may subsequently service a geographic location that said current cell is servicing, and wherein the incrementing step includes the step of incrementing a counter for each candidate hand-off cell when a signal level of said each candidate hand-off cell exceeds the predetermined number.

3. A method of handing-off subscriber unit communications between cells of a cellular communication system comprising the steps of:

comparing a signal level of a current cell with signal levels of candidate hand-off cells:

incrementing a counter when a signal level of at least one of said candidate hand-off cells is greater than said signal level of said current cell:

initiating a hand-off request to one of said candidate hand-off cells when said counter exceeds a predetermined number; and receiving a cell ID within a broadcast channel provided by a satellite of said communication system, and wherein the comparing step is performed by a subscriber unit that contains system configuration information stored therein, and wherein the comparing step further comprises the step of evaluating said system configuration information and said cell ID to determine said candidate hand-off cells.

4. A method as claimed in claim 1 wherein a subscriber unit engages in communications with said cellular communication system through said current cell, and wherein the initiating step includes the step of providing said communication system with a cell ID of said one of said candidate hand-off cells, said system either granting or denying a hand-off to said one of said candidate hand-off cells, and wherein the method further comprises the step of transferring said communications from said current cell to said one of said candidate hand-off cells in response to said initiating step.

5. A method of handing-off subscriber unit communications between cells of a cellular communication system wherein said subscriber unit communicates with a satellite communication station of said communication system using a time division multiplexed (TDM) frequency channel having TDM frames, the method comprising the steps of:

comparing a signal level of a current cell with signal levels of candidate hand-off cells:

incrementing a counter when a signal level of at least one of said candidate hand-off cells is greater than said signal level of said current cell:

initiating a hand-off request to one of said candidate hand-off cells when said counter exceeds a predetermined number; and measuring a signal level of each of said candidate hand-off cells, and wherein the measuring, the comparing and the incrementing steps are performed once for every other of said TDM frames.

6. A method as claimed in claim 5 further comprising the step of repeating the measuring, comparing and incrementing steps for each of said TDM frames, and wherein the initiating step is performed after a predetermined period of time has passed.

7. A method as claimed in claim 6 wherein the incrementing step, said counter is associated with one of said candidate hand-off cells having a highest power level, and the initiating step further comprises the step of selecting said one of said candidate hand-off cells having a greatest accumulated count.

8. A method as claimed in claim 7 wherein the incrementing step further comprises the step of incrementing a second counter associated with said current cell, and wherein the initiating step comprises the step of initiating said hand-off request to said one cell when said second counter exceeds a first predetermined threshold, and wherein the comparing, the incrementing and the initiating steps are performed by a subscriber unit.

9. A method as claimed in claim 8 wherein said current cell is associated with a first satellite of said communication system, said method further comprising the step of determining if said one of said candidate hand-off cells having a greatest accumulated count is provided by a second satellite of said communication system, and wherein the initiating step comprises the step of initiating said hand-off request to said one cell when said second counter exceeds a second predetermined threshold, said second predetermined threshold being greater than said first predetermined threshold.

10. A method as claimed in claim 7 further comprising the step of resetting said counter when said signal level of said current cell is greater than said signal levels of said candidate hand-off cells compared in the comparing step.

11. A method of accessing a cellular communication system which projects a plurality of cells which move relative to earth's surface, said method comprising the steps of:

comparing signal levels of broadcast channels of a portion of said plurality of cells;

incrementing a counter associated with a cell of said portion having a greatest of said signal levels; and initiating an acquisition request on an acquisition channel of one of said cells having a greatest accumulated counter.

12. A subscriber unit for operating in a cellular communication system which projects cells which move relative to earth's surface comprising:

a transceiver for receiving signals from a plurality of cells;

a processor for comparing a signal level of a current cell of said plurality with signal levels of other cells of said plurality, said other cells being candidate hand-off cells, each candidate hand-off cell having a counter associated therewith, and incrementing one of the counters when a signal level of at least one of said candidate hand-off cells is greater than said signal level of said current cell, said one counter being associated with said one candidate hand-off cell; and a memory for storing said counter for each candidate hand-off cell, wherein said subscriber unit initiates a hand-off request to one of said candidate hand-off cells when said counter exceeds a predetermined number.

13. A subscriber unit as claimed in claim 12 wherein said cellular communication system comprises at least one orbiting satellite that provides said plurality of cells, wherein said plurality of cells is moving relative to earth's surface, and wherein the transceiver includes means for receiving a list of said candidate hand-off cells from said communication system, said candidate hand-off cells including only cells that may subsequently service a geographic location that said current cell is servicing.

14. A subscriber unit for operating in a cellular communication system which projects cells which move relative to earth's surface comprising:

a transceiver for receiving signals from a plurality of cells;

a processor for comparing a signal level of a current cell of said plurality with signal levels of other cells of said plurality, said other cells being candidate hand-off cells, and incrementing a counter when a signal level of at least one of said candidate hand-off cells is greater than said signal level of said current cell; and a memory for storing said counter, wherein said subscriber unit initiates a hand-off request to one of said candidate hand-off cells when said counter exceeds a predetermined number, wherein the transceiver includes means for receiving a cell ID within a broadcast channel provided by a satellite of said communication system, and wherein the memory contains system configuration information stored therein, and wherein the processor includes means for evaluating said system configuration information and said cell ID to determine said candidate hand-off cells.

15. A subscriber unit for operating in a cellular communication system which projects cells which move relative to earth's surface comprising:

a transceiver for receiving signals from a plurality of cells;

a processor for comparing a signal level of a current cell of said plurality with signal levels of other cells of said plurality, said other cells being candidate hand-off cells, and incrementing a counter when a signal level of at least one of said candidate hand-off cells is greater than said signal level of said current cell, said subscriber unit engaging in communications with said communication system through said current cell, wherein said subscriber unit initiates a hand-off request to one of said candidate hand-off cells when said counter exceeds a predetermined number;

a memory for storing said counter;

means for providing said communication system with a cell ID of said one of said candidate hand-off cells, said system either granting or denying a hand-off to said one of said candidate hand-off cells; and means for transferring said communications from said current cell to said one of said candidate hand-off cells.

16. A subscriber unit for operating in a cellular communication system which projects cells which move relative to earth's surface comprising:

a transceiver for receiving signals from a plurality of cells;

a processor for comparing a signal level of a current cell of said plurality with signal levels of other cells of said plurality, said other cells being candidate hand-off cells, and incrementing a counter when a signal level of at least one of said candidate hand-off cells is greater than said signal level of said current cell; and a memory for storing said counter, wherein said subscriber unit initiates a hand-off request to one of said candidate hand-off cells when said counter exceeds a predetermined number, wherein said transceiver includes means for communicating with a satellite communication station of said communication system using a time division multiplexed (TDM) frequency channel having TDM frames, and has means for measuring a signal level of each of said candidate hand-off cells, and wherein the processor includes means for measuring said signal level of each of said candidate hand-off cells once for every other of said TDM frames.

17. A subscriber unit as claimed in claim 16 wherein said processor initiates said hand-off request after a predetermined period of time has passed.

18. A subscriber unit as claimed in claim 17 wherein said counter is associated with one of said candidate hand-off cells having a highest power level, and the processor has means for selecting said one of said candidate hand-off cells having a greatest accumulated count.

19. A subscriber unit as claimed in claim 18 wherein the processor has means for incrementing a second counter associated with said current cell, and initiating said hand-off request to said one cell when said second counter exceeds a first predetermined threshold.

20. A subscriber unit as claimed in claim 19 wherein said current cell is associated with a first satellite of said communication system, said subscriber unit further comprising means for determining if said one of said candidate hand-off cells having a greatest accumulated count is provided by a second satellite of said communication system, and said subscriber unit has means for initiating said hand-off request to said one cell when said second counter exceeds a second predetermined threshold, said second predetermined threshold being greater than said first predetermined threshold.

21. A subscriber unit as claimed in claim 18 wherein the processor includes means for resetting said counter when said signal level of said current cell is greater than said signal levels of said candidate hand-off cells.

22. A method of accessing a cellular communication system which projects a plurality of cells which move relative to earth's surface, said method comprising the steps of:

comparing signal levels of broadcast channels of a portion of said plurality of cells;

incrementing a counter associated with a cell of said portion having a greatest of said signal levels; and initiating an acquisition request on an acquisition channel of one of said cells having a greatest accumulated counter, wherein the comparing step, said portion includes only cells that are presently servicing or may subsequently service a geographic location of said subscriber unit.

* * * * *